United States Patent [19]

Jennings

[11] 4,305,846

[45] Dec. 15, 1981

[54] SOLUTION PREPARATION

[75] Inventor: James R. Jennings, Yarm, England

[73] Assignee: Imperial Chemical Industries Limited, London, England

[21] Appl. No.: 131,390

[22] Filed: Mar. 17, 1980

[30] Foreign Application Priority Data

Mar. 27, 1979 [GB] United Kingdom ............... 10578/79

[51] Int. Cl.$^3$ ........................ B01J 23/84; C01B 21/48
[52] U.S. Cl. .................................... 252/470; 423/395; 423/656
[58] Field of Search ................. 252/470; 423/395, 656

[56] References Cited

U.S. PATENT DOCUMENTS

| 910,530 | 1/1909 | Halvorsen | 423/393 |
|---|---|---|---|
| 1,330,772 | 2/1920 | Bosch et al. | 252/470 |
| 1,908,484 | 5/1933 | Larson | 252/470 |
| 2,581,519 | 1/1952 | Critchley | 423/395 |
| 2,631,086 | 3/1953 | Moak et al. | 252/470 |
| 2,946,677 | 7/1960 | Shelton | 423/395 |
| 2,968,636 | 1/1961 | Sciallano et al. | 252/470 |

FOREIGN PATENT DOCUMENTS

| 1057583 | 5/1959 | Fed. Rep. of Germany | 252/470 |
|---|---|---|---|
| 1792583 | 11/1971 | Fed. Rep. of Germany | |
| 2519820 | 11/1975 | Fed. Rep. of Germany | |
| 2510699 | 9/1976 | Fed. Rep. of Germany | |
| 1086221 | 10/1967 | United Kingdom | 252/470 |
| 1252176 | 11/1971 | United Kingdom | |
| 1259381 | 1/1972 | United Kingdom | |
| 1504627 | 3/1978 | United Kingdom | |
| 471112 | 5/1975 | U.S.S.R. | 252/470 |

OTHER PUBLICATIONS

Louisi et al., Chem. Ing. Tech. (1976), 48(6), 544–545.
Kirk-Othmer's Encyclopedia of Chemical Technology (3rd Ed. vol. 6, 88, 100; 2nd Ed. vol. 12, 39–40).
Sidgwick, The Chemical Elements and Their Compounds, vol. II (May, 1965), 698, 699, 1000, 1001, 1332, 1333, 1356, 1357.
Christian et al., "What to Look for in CO Conversion Catalysts," Chemical Engineering (May 1949), 148–150.

*Primary Examiner*—Earl C. Thomas
*Assistant Examiner*—Wayne A. Langel
*Attorney, Agent, or Firm*—Cushman, Darby & Cushman

[57] ABSTRACT

A solution containing nitrates of iron and chromium is produced by reacting metallic iron or an iron alloy with nitric acid in the presence of a hexavalent chromium compound. The solution is the starting material for making an iron-chrome oxide catalyst for the shift reaction of carbon monoxide with steam.

8 Claims, No Drawings

SOLUTION PREPARATION

This invention relates to solution preparation, in particular of the nitrates of iron and chromium, the production of a catalyst containing iron oxide and chromium oxide from such a solution, and to an oxide composition reducible to a shift catalyst.

The iron-chrome shift catalyst when in use contains a mixture of divalent and trivalent iron oxides, in combination with trivalent chromium oxide, and is usually brought into its active form by reducing an oxide precursor composition in a higher valency state. Some oxide compositions used in the past have contained hexavalent chromium, but this is undesirable because of toxicity and of the large heat evolution during reduction. It has therefore been proposed to reduce the hexavalent chromium to trivalent chromium during production of the oxide composition, for example by reaction with a divalent iron compound such as ferrous carbonate. This has the drawback that the only inexpensive iron compound from which the ferrous carbonate could be made is ferrous sulphate, so that steps have to be taken to avoid contamination of the oxide composition by sulphur or to prolong the reduction treatment until sulphur compounds have been driven out. Among the methods proposed for making low-sulphur oxide compositions are that described in U.K. Pat. No. 1,259,381, which describes an initial stage of precipitation of ferrous oxalate, and that described in U.K. Pat. No. 1,252,176, which describes thermal decomposition of nitrates. These methods are expensive, especially that of U.K. Pat. No. 1,252,176 because of the cost of the chromium nitrate.

We have now discovered a simple way of making a solution of the nitrates of iron and chromium from inexpensive materials, namely metallic iron or iron alloy, a hexavalent chromium compound and nitric acid. Our method depends on the observation that hexavalent chromium compounds undergo reduction by iron to the trivalent state despite the presence of the strongly oxidising nitric acid.

According to the invention a solution containing nitrates of iron and chromium is made by reacting metallic iron or an alloy thereof with nitric acid in the presence of one or more hexavalent chromium compounds.

The source of metallic iron can be pure or substantially pure iron. If it contains carbon, this may be oxidised by the nitric acid, but any unreacted carbon can be separated by settling or filtration. Depending on the use to which the solution is to be put, the iron source can be an iron alloy. Thus when it is to be a starting material in making an iron-chrome catalyst, the iron alloy used preferably contains chromium as the major constituent other than iron. Thus steels containing up to 5% or possibly up to 12% $^w/w$ of chromium can for example be used. The extent to which other constituents may be present in such an alloy is limited by the used to avoid introducing metals having an undesired catalytic action. In particular, the content of nickel or cobalt in the alloy should be under 15% $^w/w$, especially under 1% $^w/w$ since, to an extent depending on the partial pressure of steam, such metals can catalyse methanation during a shift process over an iron-chrome catalyst. Other minor constituents of alloy steels, for example manganese and vanadium, are not injurious in this way, however, and aluminium is sometimes considered desirable in iron-chrome catalysts to be used at higher temperatures, for example, over 450° C.

The concentration of the nitric acid used should not be so high as to passivate the metallic iron. This concentration depends on what other materials, for example alloying metals, are present, but for most operations is conveniently in the range 20 to 50, especially 25 to 40% $^w/w$ initially and during reaction. Reaction is continued, preferably with additions of more concentrated nitric acid to maintain such a concentration, until the required quantity of ferric nitrate is approached. Thereafter reaction is carried out so as to use up the nitric acid until its concentration has fallen to under 10% $^w/w$, that is, about 1.5 molar, but preferably not below about 1% since, in the presence of excess iron as is preferably used, a lower concentration may result in formation of sludge.

The reaction of the iron and any other metals present with the nitric acid produces gaseous nitrogen oxides as by products. These are preferably absorbed in water, preferably in the presence of oxygen or an oxygen-containing gas such as air, and the resulting acid solution is returned to the metal dissolving operation. If the metal dissolving operation is batchwise, the acid solution from one batch can be stored and used as an ingredient of a later batch. Any nitrogen oxides not absorbed by the step of contacting with water can be absorbed in alkali in order to avoid atmospheric pollution.

The temperature of the metal-dissolving operation is suitably in the range 40°–80° especially 50°–70° C. Provision is usually made to heat the acid to start the reaction, to cool the solution once the metal-dissolving exothermic reaction has begun and thereafter to heat the solution as the acid concentration falls, in order to keep up the reaction rate. If desired, oxygen or an oxygen-containing gas such as air can be blown through the acid to contribute to oxidation of the metals, or the mixture can be pumped in a recycle system to assist agitation.

The hexavalent chromium compound is introduced suitably as one or more chromic acids, chromic anhydride or one or more soluble chromate salts. Alkali metal chromates and dichromates are preferred as a result of their low cost, in particular sodium dichromate which is commercially available in aqueous solution.

The invention provides also a method of making an oxide composition reducible to a catalyst for the shift reaction of carbon monoxide with steam to form carbon dioxide and hydrogen, which comprises
(a) forming a solution containing nitrates of iron and chromium by the method herein defined and adjusting, if necessary, the relative proportions of iron and chromium to that required in the catalyst;
(b) converting the nitrates to an intimate mixture of the oxides.

Usually such a catalyst is used as a fixed bed, hence the method then involves the further step of forming the oxides into pieces, which for this type of catalyst suitably have all their dimensions in the range 2 to 20 mm, with no dimension of a single piece more than 5 times another. The pieces are made suitably by compression of the oxide composition with a lubricant such as graphite into cylinders having flat, indented or protrusioned end surfaces. Alternatively they can be made by extrusion or granulation, of a wet composition, possibly with a binder material. To give an active catalyst the oxide composition is reduced by means of a mixture of steam and hydrogen or a compound reactible with steam to produce hydrogen in the conditions of reduction, which usually include a temperature in the range 150°–400° C.

The ratio of iron to chromium in the catalyst is typically in the range 20:1 to 6:1 calculated by weight as the sesquioxides. Usually this ratio is attained by controlling the weights of chromium compound and nitric acid used in the solution preparation step. Preferably at least 50% of the chromium is derived from the hexavalent chromium compound. If a ratio adjustment is made it is more conveniently by adding iron nitrate to a solution containing too much chromium, since externally supplied chromium nitrate is very expensive. A small addition of hexavalent chromium (for example up to 1% of the $Cr_2O_3$ used) may be tolerable if made after the wet stages of catalyst preparation but is best avoided on account of its toxicity and its high reduction exotherm.

If desired, a lead salt may be added to the solution, in order to take advantage of the effect of lead oxide in the low sulphur catalyst to be produced by the method.

Conversion of the nitrates to an intimate mixture of oxides can be simply by evaporation and calculation if the hexavalent chromium compound has been a chromic acid or anhydride or an ammonium chromate or if alkali can be tolerated in the oxide composition. However, it is preferred to convert the nitrates to oxides by way of co-precipitating them with an alkaline reactant such as a carbonate or hydroxide of an alkali metal or ammonium. If desired they can be co-precipitated as oxalates, and possibly thereafter converted to hydroxides, but this is not necessary. The resulting hydroxides or oxalates are then thermally decomposed to oxides. Co-precipitation with an alkali metal compound is normally followed by thorough washing of the precipitate to decrease its alkali content to under 0.4%, especially under 0.2% $w/w$ calculated as equivalent $Na_2O$.

By the method according to the invention it is possible to make an oxide composition reducible to a catalyst for the reaction of carbon monoxide with steam to form carbon dioxide and hydrogen, the composition having the following properties:

$Fe_2O_3/Cr_2O_3$ weight ratio in the range 20:1 to 6:1, especially 12:1 to 8:1;
surface area 100–250, especially 120–200 $m^2/g$;
mean pore radius 10–100, especially 15–50, Angstrom units;
loss on ignition at 900° C. over 10, especially 15–25% $w/w$.

Such a combination of properties is believed to characterise a new composition of matter.

Whether or not the oxide composition has such properties, it preferably has a sulphur content of less than 0.2% $w/w$ expressed as $SO_3$, preferably not more than 0.1% $w/w$. Thus it can be brought into use without a lengthy reduction treatment to remove sulphur compounds.

The shift reaction over the catalyst made from the oxide composition by reduction is of the high temperature type, that is, at an outlet temperature between 350° and 500° C. The inlet temperature is typically in the range 300°–400° C.

EXAMPLE 1

Solution preparation

A stainless steel jacketed vessel equipped with a propeller agitator was charged with 5000 kg of 9.5 mm thick mild steel plate punching scrap in pieces about 10 cm×5 cm. To it were added 800 kg of water and then, with agitation, 200 kg of 69% $w/w$ sodium dichromate $Na_2Cr_2O_7$, followed by 800 kg of a weak nitrous/nitric acid solution (combined acid strength approx. 0.5–1.5 N) recovered by scrubbing with water the vapours evolved in a previous run. Then 2400 liters of approx. 64% $w/w$ nitric acid were stirred in. The jacket of the vessel was heated with steam until the iron began to dissolve. Then cold water was passed through the jacket at a rate sufficient to keep the temperature below 60° C. Nitrous fumes were evolved and were vented to a water-scrubber to provide weak acid for a later run. Stirring was continued until reaction ceased. The solution, of strength 100–140 g/l as Fe was pumped to storage. A fresh charge of water was fed on to the remaining metallic iron, which would otherwise have oxidised in air, to prepare for the next run.

Catalyst preparation

A solution (approx 4000 l) at 50° C. of ferric nitrate and chromium nitrate from the above preparation and containing per liter 180 g of $Fe_2O_3$ 17 g of $Cr_2O_3$ and 63 g of free $HNO_3$ was fed to a stirred solution (approx. 8000 l) of sodium carbonate (250 g per liter) at 60° C. until the pH was in the range 7.0–8.5 measured at 25° C. The resulting suspension of the hydroxides of iron and chromium was stirred until no further carbon dioxide was evolved, then washed and dried. The dry oxide composition was found by analysis to contain 0.1% $w/w$ of sulphur expressed as $SO_3$ and 0.05% $w/w$ of sodium expressed as $Na_2O$.

A sample of the oxide composition was milled, mixed with 3% of its weight of graphite, granulated and then compressed into 3.6×5.4 mm squat cylindrical pellets. These pellets are the catalyst precursor as handled in commerce. A sample of pellets was reduced to active form by means of a steam-hydrogen mixture at 300° C. and then tested in the shift reaction. The effluent from the reduction was sulphur-free by the end of reduction. The catalyst had activity in the shift reaction at least equal to that of a commercially available high temperature shift catalyst.

EXAMPLE 2

Example 1 was repeated except that the nitric acid, fresh and recovered, was added steadily during solution preparation at a rate just sufficient to keep the free acid concentration at 35% $w/w$. By this means the reaction was more easily controlled and the composition of the evolved nitrogen oxides was kept more nearly constant. The catalyst resulting from this preparation was almost identical with that made by Example 1.

The micromeritic properties of the two oxide compositions after pelleting were as follows:
surface area: 178 $m^2/g$
mean pore radius: 25 Angstrom units
loss on ignition at 900° C.: 20% $w/w$.

I claim:

1. A method for producing a solution containing nitrates of iron and chromium which comprises reacting metallic iron or an alloy thereof with nitric acid in the presence of one or more hexavalent chromium compounds.

2. A method according to claim 1 in which the concentration of nitric acid is in the range 25 to 40% $w/w$ initially and during reaction, and reaction is thereafter continued until the nitric acid concentration has fallen to under 10 but not below 1% $w/w$.

3. A method according to claim 1 in which gaseous nitrogen oxides produced during reaction as by-products are absorbed in water and the resulting solution is returned to the metal dissolving operation.

4. A method according to claim 1 in which the hexavalent chromium compound is introduced as sodium dichromate.

5. A method of making an oxide composition reducible to a catalyst, which comprises
   (a) forming a solution containing nitrates of iron and chromium by reacting metallic iron or an alloy thereof with nitric acid in the presence of one or more hexavalent chromium compounds; and
   (b) converting the nitrates to an intimate mixture of the oxides.

6. A method according to claim 5 in which the nitrates are converted to oxides by way of co-precipitating them with an alkaline reactant.

7. A method according to claim 6 in which the alkaline reactant is an alkali metal compound and the precipitate is washed to decrease its alkali content to under 0.2% $^w/w$ calculated as equivalent $Na_2O$.

8. A method of making an iron-chromium oxide composition convertible by reduction to a catalyst for the high temperature shift process, said oxide composition having the following properties:
   $Fe_2O_3/Cr_2O_3$ weight ratio: 20:1 to 6:1
   surface area: 100–250 m$^2$/g
   mean pore radius: 10–100 Angstrom units
   loss of ignition: over 10% $^w/w$
   sulphur content: less than 0.2% $^w/w$ expressed as $SO_3$.

said method comprising the steps of:
   (a) producing a solution containing the nitrates of iron and chromium by reacting metallic iron or an alloy thereof with nitric acid in the presence of one or more hexavalent chromium compounds;
   (b) reacting the resulting solution with an alkali metal carbonate whereby to co-precipitate the hydroxides of iron and chromium;
   (c) washing the precipitate to decrease its alkali content to under 0.4% calculated as equivalent $Na_2O$; and
   (d) forming the precipitate into pieces having all their dimensions in range 2–20 mm, with no dimension of a single piece more than 5 times another.

* * * * *